US008854181B2

(12) United States Patent
Lopez et al.

(10) Patent No.: US 8,854,181 B2
(45) Date of Patent: *Oct. 7, 2014

(54) REMOTE KEYLESS ENTRY TRANSMITTER

(71) Applicants: Emmanuel Enrique Lopez, Georgetown, TX (US); Michael Laranang, Georgetown, TX (US)

(72) Inventors: Emmanuel Enrique Lopez, Georgetown, TX (US); Michael Laranang, Georgetown, TX (US)

(73) Assignee: Secured Mobility, LLC, Georgetown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/919,720

(22) Filed: Jun. 17, 2013

(65) Prior Publication Data

US 2013/0278381 A1    Oct. 24, 2013

Related U.S. Application Data

(63) Continuation of application No. 12/437,719, filed on May 8, 2009, now Pat. No. 8,466,774.

(60) Provisional application No. 61/051,588, filed on May 8, 2008.

(51) Int. Cl.
| G05B 19/00 | (2006.01) |
| B60R 25/24 | (2013.01) |
| G08C 17/02 | (2006.01) |
| G07C 9/00 | (2006.01) |

(52) U.S. Cl.
CPC ...... *G08C 17/02* (2013.01); *G07C 2009/00793* (2013.01); *B60R 2325/101* (2013.01); *B60R 25/24* (2013.01); *G07C 9/00103* (2013.01)
USPC ........ 340/5.61; 340/5.72; 340/5.64; 340/5.71

(58) Field of Classification Search
CPC ............. B60R 25/24; B60R 2325/101; G07C 9/00103; G07C 2009/00793; G08C 17/02
USPC ........ 340/5.1, 5.2, 5.6, 5.61, 5.62, 5.63, 5.64, 340/5.7, 5.72; 701/1, 29, 33, 35, 49
See application file for complete search history.

(56) References Cited

U.S. PATENT DOCUMENTS

| 3,821,704 A | * | 6/1974 | Sabsay ......................... 340/5.23 |
| 5,046,093 A | | 9/1991 | Wachob |

(Continued)

OTHER PUBLICATIONS

Operator's Instructions DJ-CM2000 Scanner/Transmitter Duplicator.

(Continued)

*Primary Examiner* — Nabil Syed
(74) *Attorney, Agent, or Firm* — Fish & Richardson P.C.

(57) ABSTRACT

A remote wireless keyless entry transmitter includes a communications interface for connecting the transmitter directly to an in-vehicle network for registering the transmitter with the vehicle access system. The interface is further connectable to a personal computer to load a set of control codes and programming codes corresponding to a vehicle. The transmitter is programmable to operate multiple functions for multiple vehicles, separately or simultaneously. The transmitter can include a transponder circuit, a display, an accelerometer and a key coupler. A wireless transponder is operationally associated with a vehicle security system by physically connecting the transponder to a vehicle data port with a temporary data link and transferring data between the security system and the transponder over the data link to enable subsequent wireless operation of the security system with the transponder. The transmitter can include an audible signal generator and be programmable to respond to a pager signal.

15 Claims, 4 Drawing Sheets

(56) References Cited

U.S. PATENT DOCUMENTS

| | | |
|---|---|---|
| 5,864,297 A | 1/1999 | Sollestre et al. |
| 5,926,103 A | 7/1999 | Petite |
| 6,801,967 B2 | 10/2004 | Nakamura et al. |
| 6,998,956 B2 | 2/2006 | Dix |
| 7,124,058 B2 | 10/2006 | Namaky et al. |
| 2003/0112121 A1 | 6/2003 | Wilson |
| 2004/0066308 A1 | 4/2004 | Sampsell |
| 2004/0155793 A1 | 8/2004 | Mui |
| 2004/0252030 A1 | 12/2004 | Trimble et al. |
| 2005/0212655 A1 | 9/2005 | Underdahl |
| 2005/0225429 A1 | 10/2005 | Burzio |
| 2005/0231323 A1 | 10/2005 | Underdahl et al. |
| 2005/0248436 A1 | 11/2005 | Hohmann et al. |
| 2005/0285724 A1 | 12/2005 | Schmidt et al. |
| 2006/0176146 A1 | 8/2006 | Krishan et al. |
| 2007/0001805 A1 | 1/2007 | Utter et al. |
| 2007/0008168 A1 | 1/2007 | Liao et al. |
| 2007/0120641 A1 | 5/2007 | Sommer et al. |
| 2007/0229301 A1 | 10/2007 | Katz |
| 2008/0150685 A1 | 6/2008 | Desai et al. |
| 2009/0113963 A1 | 5/2009 | Pocrass |

OTHER PUBLICATIONS

Operator's Instructions, CT2000E/CT2000SR, Replacement Remote Control Operation.

Operator's Instructions, Model: RMC888; Duplicator Operating Instruction.

Operator's Instructions, "StingPro—Learning Remote—TX-44".

Operator's Instructions, "Skylink" Model 39, Universal Garage Door Remote Control.

Operator's Instructions, "JMA" CTM-200 Remote Control Duplicator Manual.

* cited by examiner

REMOTE KEYLESS ENTRY TRANSMITTER

CROSS-REFERENCE TO RELATED APPLICATIONS

This application is a continuation application of and claims priority to U.S. application Ser. No. 12/437,719 filed on May 8, 2009 and U.S. Provisional Application No. 61/051,588, filed May 8, 2008.

TECHNICAL FIELD

This invention relates to remote keyless vehicle access systems, and more particularly to remote keyless entry transmitters.

BACKGROUND

Wireless radio frequency (RF) transmitter-receiver systems and other wireless signal transmitter-receiver systems are employed in a variety of security systems and remote activation systems. For example, rolling code and fixed code RF transmitters for use with receivers in garage door openers and security gate openers are disclosed in U.S. Pat. No. 6,956,460, which is incorporated herein by reference in its entirety.

RF transmitter fobs, transponders or "remotes" are generally used in the automotive industry to activate and deactivate vehicle security systems, referred to herein as "vehicle access systems." RF transmitters can also be used to perform other tasks including remote starting, locking and unlocking doors, unlatching trunk decks or tail gates, opening windows or doors and operating convertible top mechanisms. Transponder circuits provide another form of contactless control of vehicle functions including door unlocking, steering wheel adjustment and deactivation of engine shut-off systems.

Generally, a remote is preprogrammed with a set of control codes and the vehicle access system receiver is programmed to recognize one or more registered remote signals. For example, a consumer can purchase a second remote that broadcasts a distinct signal, e.g., incorporating a portion of the remote unit serial number, that is registered with or learned by the vehicle access system. Dealers often stock a large number of remote units with different sets of control codes for different vehicles because such codes are typically preloaded onto the remote transmitter by the manufacturer. Registration of the transmitter with a particular vehicle access system is generally performed by a dealer using a sophisticated multi-system diagnostic scan tool to interface the vehicle access system through the in-vehicle network diagnostic port, e.g., OBD or OBDII port.

Improvements are sought in the programming and registering of remotes with vehicle access systems.

SUMMARY

One aspect of the invention features a wireless transmitter for use with a vehicle having an access system. The transmitter includes a handheld housing; a wireless signal generator positioned within the housing for communication with the vehicle access system; controls accessible on the exterior of the housing operable to activate the wireless signal generator; and a processor positioned within the housing and operably coupled to the signal generator and the controls. The transmitter further includes a communication interface operably coupled to the processor and configured to be temporarily and releasably connected to a data port of the vehicle to establish a temporary, wired programming connection between the processor and the vehicle access system.

In some implementations, the communication interface is connectable to the in-vehicle network by physical connection to a data port that also serves as a vehicle diagnostic port. For example, an adapter or cabled adapter allows the communications interface to connect to standard OBD or OBDII ports or proprietary ports.

In other implementations, the communication interface includes a wireless receiver or wireless transmitter to communicate with a wireless transmitter or wireless receiver physically connected to the in-vehicle network. The communication interface is connectable to the in-vehicle network via a wireless networking protocol, such as, for example, RF, IR, Bluetooth or Wifi protocols. For example, a wireless adapter can be connected to the OBD port such that the transmitter can connect to the port wirelessly.

In some implementations, the communication interface is connectable to a personal computer for programming of control codes and programming codes. For example, the transmitter is loaded with codes using a personal computer and a CD containing a database of control codes and programming codes for different years, makes and models of cars.

In some cases, the communication interface is connectable to a personal computer via a cable connected a data port on the personal computer.

In some cases, the communication interface is connectable to a personal computer via a wireless networking protocol.

In another implementation, the transmitter includes a transponder circuit for communication with the in-vehicle network via an RFID wireless networking protocol. In some cases, transponder circuit is programmed or programmable to control a vehicle engine immobilizer system. In some cases, the transmitter can be used to program the transponder circuit or the vehicle engine immobilizer system. The transmitter of claim 8, wherein one of the transponder circuit and a vehicle engine immobilizer system is programmable via the communications interface connected to the in-vehicle network to interact with the other of the transponder circuit and the vehicle engine immobilizer.

In some implementations, the transmitter includes a display for displaying selectable transmitter functions. In some cases, the selectable transmitter functions correspond to vehicle access system functions of multiple vehicles.

In some implementations, the transmitter includes an expansion port in communication with the processor. The expansion port can receive a removable medium having control codes stored thereon or can interface peripheral devices.

Another aspect of the invention features a programmable remote keyless entry fob for controlling a vehicle access system. The fob includes a signal generator for transmitting control codes to a vehicle access system; a processor coupled to the signal generator; a switch coupled to the processor and operable to cause the signal generator to transmit the control codes to the vehicle access system; and a communications interface coupled to the processor and configured to connect the fob to an in-vehicle network, the processor configured to transmit programming codes to place the in-vehicle network in a programming mode to register the fob with the vehicle access system whereby the vehicle access system will respond to the control codes.

In some implementations, the communications interface is connectable to a personal computer to load control codes onto the fob.

In a particular implementation, the communications interface is connectable to a data port on a personal computer, such as a USB port, and to a vehicle data port, such as an OBD port.

In other cases, the communications interface is connectable to other standardized or proprietary communications ports.

In some implementations, the fob includes a data interface cable configured for temporary wired connection to a data port on a personal computer and/or a data port on a vehicle. In some cases, the data port on the personal computer is a USB port and the data port on the vehicle is an OBD diagnostic port.

In another implementation, the fob includes an audible signal generator and the processor is configured to register a paging signal so that the fob can be located using a paging signal. For example, the paging signal can be a telephone handset paging signal or a paging signal from another remote fob used to locate the fob. In another implementation, the fob includes a wireless transceiver distinct from the wireless signal generator.

Another aspect of the invention features a method of operationally associating a wireless access transponder with a security system of a vehicle. The method includes physically connecting the transponder to a data port of the vehicle with a temporary data link; transferring data between the security system and the transponder over the data link to enable subsequent wireless operation of the security system with the transponder; and disconnecting the transponder from the vehicle.

In one application, the method includes first physically connecting the transponder to a data port on a personal computer and transferring from the personal computer to the fob a set of control codes.

In another application, the method includes transferring from the personal computer to the transponder a set of programming codes useful to place the vehicle security system in a programming state to register the transponder with the vehicle security system.

In some cases, the data comprises control code data corresponding to access system features, the method further comprising transmitting the code data wirelessly between the transponder and vehicle access system to activate a particular access system feature.

In some cases, transferring code data renders the security system responsive to the fob. And in other cases, transferring code data renders the fob operable to activate a security system feature. Another aspect of the invention features a method of programming a vehicle access system keyless access fob. Connecting the fob to a personal computer; loading onto the fob from the personal computer a set of vehicle access system control code data and programming code data associated with a selected vehicle manufacturer; then connecting the fob directly to an in-vehicle network port of a vehicle having a vehicle access system; and registering the fob with the vehicle access system.

In some applications, registering the fob includes placing the vehicle access system in a programming mode using programming code data loaded on the fob and transmitting from the fob a portion of the control code data.

In some cases, the method includes connecting the fob to an in-vehicle network of a vehicle and registering the fob with a vehicle access system of the second vehicle.

In some applications, the method includes mapping a vehicle access system feature to a fob control.

In some cases, mapping includes assigning a hierarchy of vehicle access system features to a fob control. For example, the hierarchy can include prioritization of first and second vehicle access system features. In some cases, the method includes displaying on the fob the hierarchy for selection of features by a user.

In some applications, the fob control is mapped to first and second vehicle access system functions for simultaneous operation of functions of the vehicle access systems of both the first and second vehicles.

Another aspect of the invention features a method of controlling a plurality of vehicles with a transmitter loaded with control codes for each vehicle. In one implementation, the control code for a particular vehicle is selected by scrolling through a vehicle select display. In some cases, code selection or the scrolling is controlled by moving or tilting the transmitter along one or more axes to operate an accelerometer or gravity-based switch.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
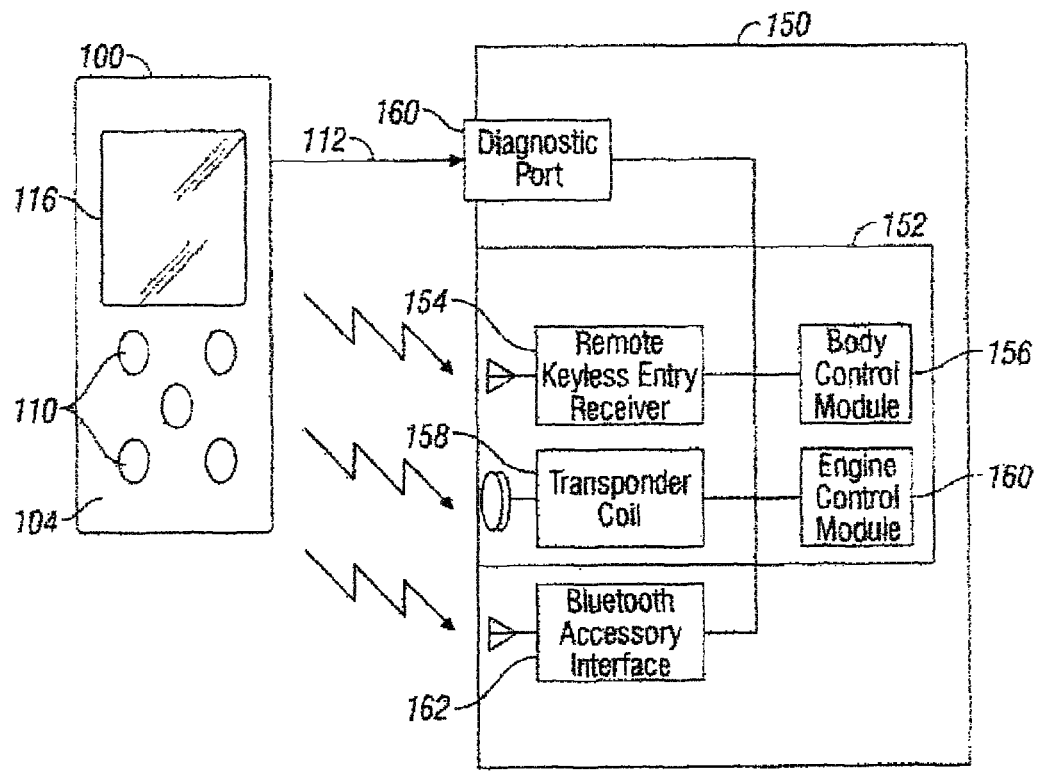
FIG. 1 is a block diagram depicting a transmitter and an in-vehicle network.

FIG. 1 illustrates a remote keyless entry transmitter 100 for controlling a wireless vehicle access system 152 and communicating with an in-vehicle network 150. Vehicle access system 152 is one of many electrical systems that are included in in-vehicle network 150. Vehicle access system 152 generally includes a remote keyless entry receiver 154 and control module 156 for operating door locks and alarm features. Some late-model vehicles also include a transponder coil 158 and engine control module 160 for shutting-off or immobilizing the engine in the absence of a registered transponder circuit. For example, some vehicles have a transponder ring around the ignition to detect a transponder circuit on the key. Some late model vehicles also include a Bluetooth accessory interface 162 for use with cellular phones, radios and other accessories. These various systems can be tested, diagnosed and programmed using a diagnostic port 160, which is generally reserved for use by a mechanic with sophisticated multi-system diagnostic scanning equipment.

Transmitter 100 is designed for field use by consumers and includes a communication interface 112 for readily communicating with in-vehicle network 150 through diagnostic port 160. Transmitter 100 also communicates wirelessly with vehicle access system 152 through remote keyless entry receiver 154 using RF, IR, Wifi, Bluetooth or other wireless network protocol. Thus, transmitter 100 is capable of communicating with vehicle access system 152 using a wireless protocol and is further capable of communicating with in-vehicle network 150 through other than vehicle access system 152, e.g., through diagnostic port 160.

Figure 2:
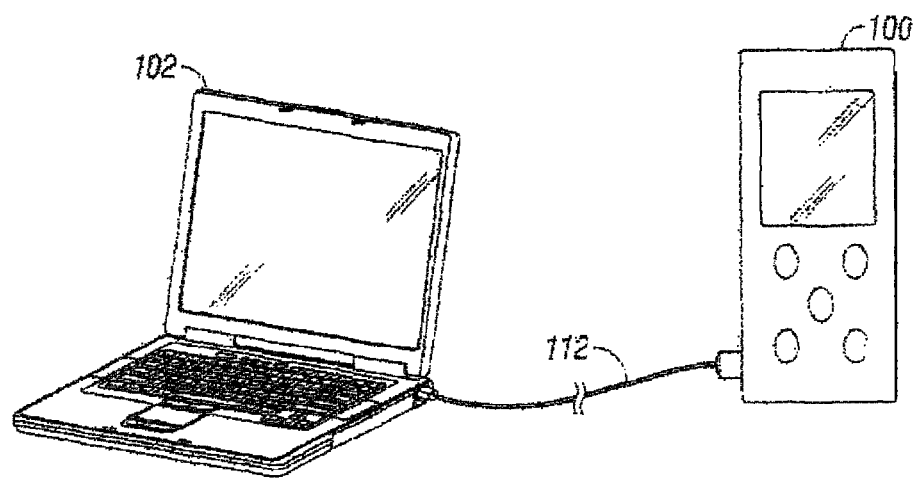
FIG. 2 is a front view of a transmitter connected to a personal computer.

With reference to FIG. 2, transmitter 100 is further connectable to a personal computer 102 via communications interface 112. Personal computer 102 is used to load onto transmitter 100 control codes for wirelessly controlling vehicle access features and diagnostic programming codes to set a vehicle access system in programming mode. For example, a consumer receives a CD containing a database of control codes and programming codes organized by year, make and model of various vehicles. The consumer loads the CD into his or her computer and selects the appropriate year, make, model and/or functions corresponding to the control codes and programming codes to be loaded onto transmitter 100. The appropriate control codes and programming codes are then loaded onto transmitter 100 via communication interface 112.

Upon loading of the codes, transmitter 100 is disconnected from personal computer 102 and is connected to diagnostic port 160 as described above. Transmitter 100 then provides the loaded programming codes to prompt in-vehicle network 150 to place vehicle access system 152 in a programming mode. Transmitter 100 then provides a control code or serial number data via diagnostic port 160 or via a wireless signal.

Figure 3:
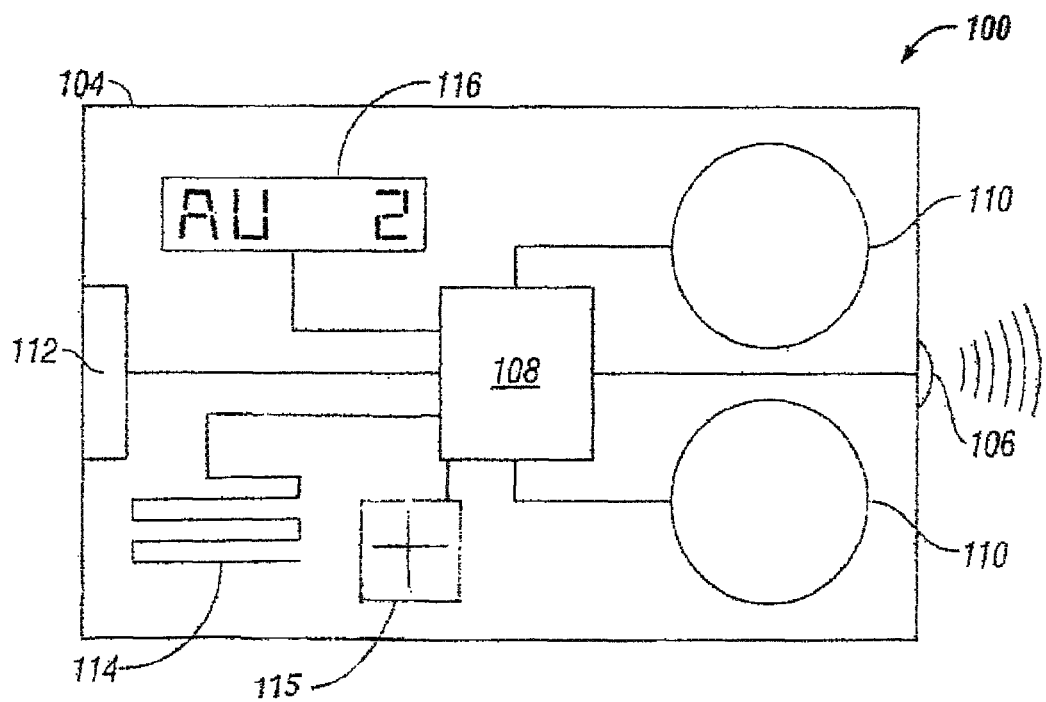
FIG. 3 is a block diagram depicting components of a transmitter.

With reference to FIG. 3, transmitter 100 includes a fob housing 104, and a processor 108 within housing 104. Processor 108 can include or be operably connected to ROM, RAM or non-volatile memory components (not illustrated).

Processor 108 is operably connected to a wireless signal generator 106. Wireless signal generator 106 can include an RF transmission circuit, IR transmission circuit, Bluetooth network circuit, or other standardized or proprietary wireless signal circuit.

Processor 108 is operably connected to controls 110. Controls 110 can be any switch, contact, button or the like, operable to activate wireless signal generator 106. Controls 110 can be assigned or "mapped" to different functions during programming of transmitter 100 by a user. For example, a user can use personal computer 102 to map different controls 110 to different vehicles, different functions or different transmitter functions.

Communications interface 112 is operably connected to processor 108 to enable connection to diagnostic port 160 and personal computer 102. Communications interface 112 can include a USB port or other standardized or proprietary port for communication with personal computer 102 and in-vehicle network 152. Communications interface 112 enables selected control codes and programming codes from personal computer 102 to be loaded onto processor 108.

An optional display 116 is provided for ease of programming and navigation of control features. In some cases, controls 110 can be presented on display 116 as touchscreen features. Display 116 can be a simple single color LCD with text capabilities or a full color display with graphic capabilities. Display 116 can display for selection available vehicles, functions, programming codes, instructions or branding. Display 116 can also display a directory of files available on a removable memory device as described below.

In some implementations, transmitter 100 can also include a transponder circuit 114 for cooperation with transponder coil 158. Transponder circuit 114 provides a means for contactless communication with in-vehicle network 150 other than wireless signal generator 106. Detection of transponder circuit 114 by transponder coil 158 can be used to activate engine control module 160 or other in-vehicle systems. Transmitter 100 can be connected to in-vehicle system 150 to register transponder circuit 114 with engine control module 160.

Transmitter 100 can communicate with in-vehicle network 150 and vehicle access system 152 to register transmitter 100 with vehicle access system 152. For example, transmitter 100 is connected to diagnostic port 160 via communications interface 112 and the loaded programming codes are used to place in-vehicle network 150 in a programming mode in which transmitter 100 can be registered with vehicle access system 152. In programming mode, vehicle access system 152 learns or registers the transmitted control codes of transmitter 100. Registration can be accomplished by directly loading an identification of transmitter 100 onto in-vehicle network 150 via communications interface 112 or by wirelessly transmitting a control code with an identification of transmitter 100 to remote keyless entry receiver 154 of vehicle access system 152.

After registration of transmitter 100 with vehicle access system 152, vehicle access system 152 is responsive to wireless signals generated by transmitter 100 after activation of controls 110.

In one implementation, transmitter 100 includes an accelerometer-based or gravity-based switch or accelerometer 115 operable to provide input to processor 108 as a function of movement or position of transmitter 100. For example, the control code for a particular vehicle can selected by scrolling through a vehicle select display or performing a particular transmitter movement, i.e., moving or tilting the transmitter along one or more axes, to operate an accelerometer-based switch 115. Accordingly, another aspect to the invention features a method of controlling a plurality of vehicles with a transmitter loaded with control codes for each vehicle. The control code for a particular vehicle is selected by moving or tilting the transmitter along one or more axes to operate an accelerometer-based switch 115 to control scrolling through a vehicle select display or simply to indicate a particular vehicle. For example, tilting transmitter upward can select a first vehicle and downward a second. A side to side tilt or shake can advance the transmitter to the next or previous vehicle. It will be appreciated that any number or combination of transmitter movements or positions can be used in place of any of the mechanical buttons or switches, on-screen functions or other selection or operation features described herein or known in the art.

Figure 4:
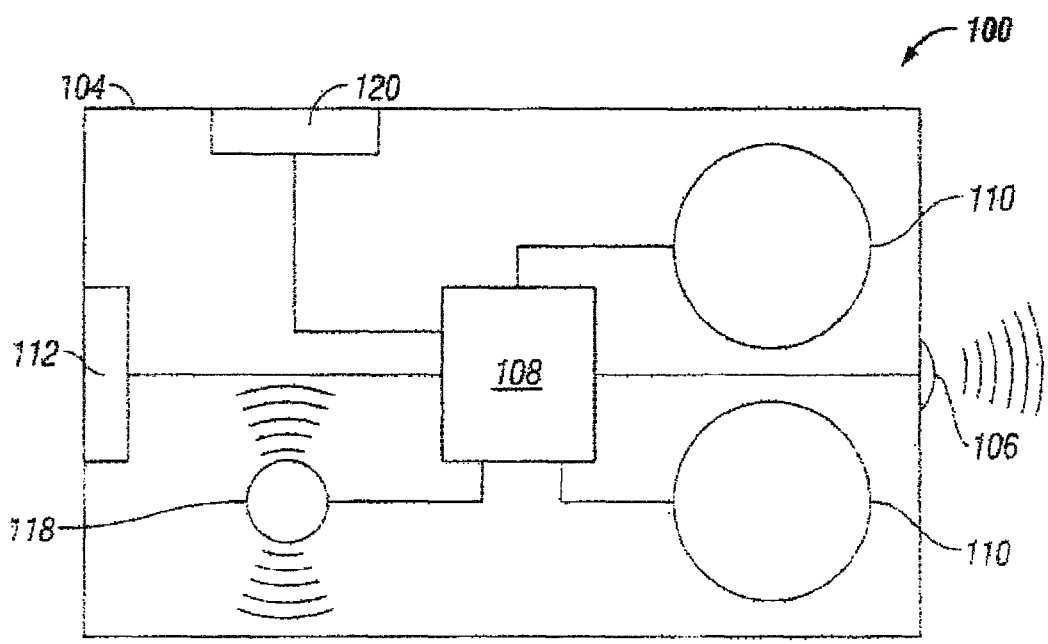
FIG. 4 is a block diagram depicting components of another transmitter.

In one implementation illustrated in FIG. 4, transmitter 100 includes an audible signal generator 118 for producing an audible signal. The audible signal can be a simple preprogrammed beep or chirp or a custom "ring tone" loaded from personal computer 102. Audible signal generator 118 can be activated in response to a paging signal or to an in-vehicle network signal. For example, a pair of transmitters 100 can be programmed to respond to a paging signal from the other of the transmitters 100.

In another example, transmitter 100 can be connected to personal computer 102 to load a code for a particular model of telephone system such that processor 108 activates audible signal generator 118 in response to a handset paging signal. Alternatively, transmitter 100 can be placed in a programming mode in which it can register a desired transmitted signal.

In another implementation, multiple control codes are generated by wireless signal generator 106 in response to a single activation of one of controls 110. This allows a user, for example, to simultaneously unlock and start a vehicle or to activate features such as door locking on multiple vehicles. In another example, controls 110 can transmit primary and secondary control codes to different vehicle access systems upon a specified actuation delay. Transmitter 100 can be loaded with varying numbers of control codes for different vehicles to accommodate a range of vehicle access system features.

Transmitter 100 can include an expansion port 120 and the control codes and programming/diagnostic codes can be loaded onto a removable memory device that is then inserted into expansion slot 120. Expansion port 120 can also be used to connect other memory devices, peripheral devices or accessories.

Figure 5:
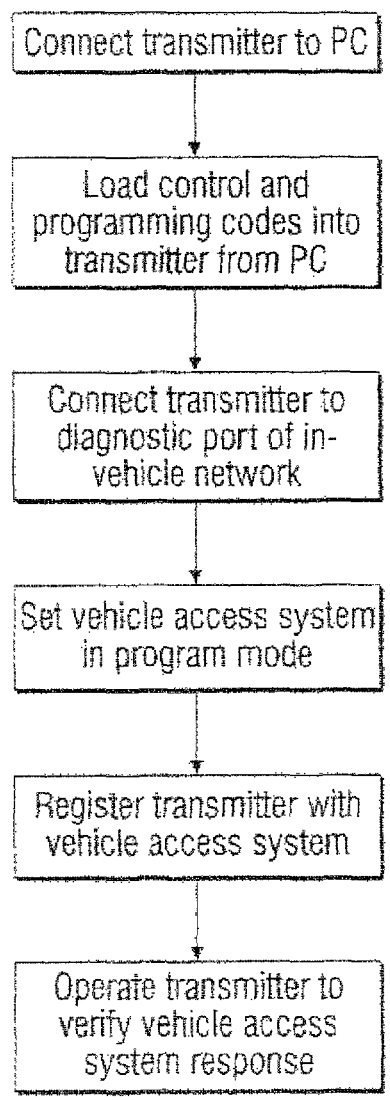
FIG. 5 is a diagram depicting a method of programming a transmitter and vehicle access system.

With reference to FIG. 5, a method of programming a transmitter 100 and vehicle access system 152 is shown. Transmitter 100 is connected to personal computer 102 using, for example, a USB adapter chord between communications interface 112 and a data port of personal computer 102.

Control codes are then selected, for example by year, make and model of the vehicle or by desired transmitter functions. Corresponding programming/diagnostic codes are also selected. The control codes and programming codes can be stored on a CD packaged for sale with the transmitter or can be available for download via the Internet. Selected control codes and programming codes are then loaded onto a processor or memory in transmitter 100 via communications interface 112. Transmitter 100 can then be disconnected from personal computer 102.

Transmitter 100 is then connected to diagnostic port 160 of in-vehicle network 150 using, for example, a cable with an OBD port adapter. In other embodiments, diagnostic port 160 can be fitted with a wireless communications interface to provide wireless connectivity with communications interface 112 of transmitter 100. Transmitter 100 provides a programming code to in-vehicle network 150 to place vehicle access system 152 in a programming mode. The programming code can be provided automatically upon connection or upon activation of controls 110.

Once vehicle access system 152 is in programming mode, a transmitter identification code is provided to register transmitter 100 with vehicle access system 152. This identification code can be included in serial number data provided directly through diagnostic port 160 or in a control code transmission provided through remote keyless entry receiver 154.

The programming code can include instructions for confirming registration of transmitter 100 or a user can simply operate controls 110 to verify registration of transmitter 100 by responsiveness of vehicle access system 150.

In a particular example, sample consumer operating instructions for programming transmitter 100 read:
1. Configuring Your Remote
   a. Connect USB cable between Remote Keyless Entry Remote Fob and computer.
   b. Select year/make/model for the first vehicle on the remote configuration application on the computer.
   c. In multi-vehicle/receiver applications, assign vehicle priority and/or map remote buttons via remote configuration application.
   d. In multi-vehicle/receiver applications, repeat steps 1b and 1c for up to N vehicles.
   e. Download transmission codes and programming/diagnostic code(s) from computer to remote.
   f. Disconnect USB cable from computer.
2. Program Vehicle to Register New Remote
   a. Connect USB cable to remote with proper vehicle adapter.
   b. Plug in vehicle adapter to diagnostic port on vehicle.
   c. Press a button (or set or series of buttons) on remote to transmit manufacturer network programming commands via vehicle diagnostic port to place the vehicle access/security system in learn mode.
   d. Press a button (or set or series of buttons) to register new remote.
   e. Disconnect cable from remote and unplug vehicle adapter.
3. Control Vehicle with Remote
   a. Scroll through vehicles on remote display by pressing vehicle selection button.
   b. Once selected vehicle is displayed on the screen, press a function button to operate vehicle access system feature.
4. Control Vehicle with Remote button groups
   a. Multiple button groups located on the same or adjacent sides of the remote can operate vehicle access system features of one or more vehicles.

Figure 6:
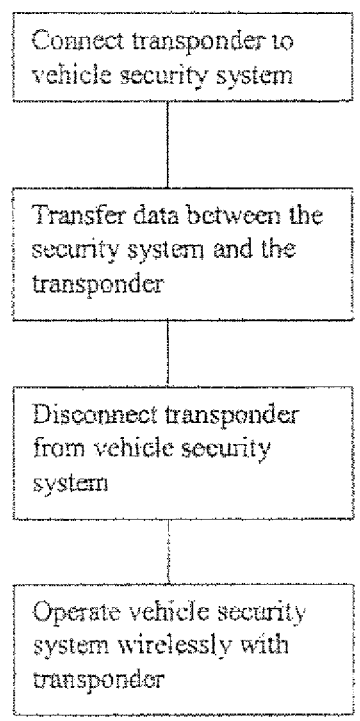
FIG. 6 is a diagram depicting a method of operationally associating a wireless transponder with a security system of a vehicle.

With reference to FIG. 6, another method is illustrated for operationally associating a wireless transponder with a security system of a vehicle. The method includes physically connecting the transponder to a data port of the vehicle with a temporary data link and transferring data between the security system and the transponder over the data link to enable subsequent wireless operation of the security system with the transponder. The transponder is then disconnected from the vehicle security system and the transponder is operated to wirelessly activate a security system feature.

Transmitter 100 can be loaded with any number of vehicle control codes to effectively emulate or replace any number of remotes. Transmitter 100 is readily field programmable by consumers and mechanics alike and provides increased flexibility for customization of remote features and vehicle access system feature activation.

A number of embodiments of the invention have been described. Nevertheless, it will be understood that various modifications can be made without departing from the spirit and scope of the invention. For example, transmitter 100 can also be loaded with control codes for garage door openers, security gate openers, home security systems and other remotely operated systems. Accordingly, other embodiments are within the scope of the following claims.

What is claimed is:

1. A programmable remote keyless vehicle entry device comprising:
   a wireless signal generator; and
   memory containing:
      programming code configured to place an access system of a vehicle in a programming mode enabling registration of the entry device with the access system; and
      control codes configured to cause the access system operate access system features in response to entry device operation with the entry device registered with the access system;
   wherein the entry device is configured to:
      transmit the programming code to the access system via a physical connection between the entry device and the vehicle while the entry device is unregistered with the access system, thereby placing the access system in a programming mode to register the entry device with the access system to enable subsequent response by the access system to the control codes; and
      wirelessly operate the access system features of the vehicle, using the control codes, after the access system exits the programming mode and the entry device is physically disconnected from the access system.

2. The entry device of claim 1, comprising a communications interface physically connectable to a personal computer to load the control codes and programming codes onto the entry device, and to the vehicle to transmit the programming code to the access system.

3. The entry device of claim 1, wherein the physical connection comprises an OBD diagnostic port.

4. A method of operationally associating a wireless access device with a security system of a vehicle, the method comprising:
- physically connecting the access device to the vehicle with a data link;
- transferring programming codes from the access device to the security system over the data link while the access device is unregistered with the security system, thereby causing the security system to enter a programming mode; and then
- transferring data from the access device to the security system, the data including a transmitter identification code, thereby registering the access device with the vehicle security system to enable subsequent wireless operation of the security system with the access device after the security system exits the programming mode and the access device is physically disconnected from the vehicle.

5. The method of claim 4, further comprising, before connecting the access device to the vehicle, physically connecting the access device to a data port on a personal computer and transferring from the personal computer to the access device a set of control codes selected to correspond with a year, make, and model of the vehicle, thereby configuring the access device for subsequent registration.

6. The method of claim 4, further comprising, before transferring the programming codes over the data link, downloading the programming codes to the access device.

7. The method of claim 4, further comprising downloading vehicle access system control code data onto the access device to configure the access device for use with the vehicle, the control code data including data configured to unlock the vehicle.

8. A method of operationally associating a keyless access device with a vehicle, the method comprising:
- downloading onto the access device programming code data configured to initiate a programming mode of the vehicle;
- connecting the access device physically to the vehicle; and
- registering the access device with the vehicle, including transferring, while the access device is unregistered with the vehicle, the downloaded programming code data to the vehicle, thereby initiating a programming mode of the vehicle to register the access device with the vehicle to enable the access device to wirelessly operate functions of the vehicle after the vehicle exits the programming mode and after the access device is physically disconnected from the vehicle.

9. The method of claim 8, further comprising downloading onto the access device control code data configured to wirelessly operate access functions of the vehicle after registering the access device with the vehicle.

10. The method of claim 8, further comprising connecting the access device to a second vehicle and registering the access device with a vehicle access system of the second vehicle.

11. The method of claim 8, further comprising mapping a vehicle access system feature to a manually operable control of the access device.

12. The method of claim 11, further comprising assigning a hierarchy of vehicle access system features to the control.

13. The method of claim 12, wherein the hierarchy includes prioritization of first and second vehicle access system features.

14. The method of claim 4, wherein the transmitter identification code is transferred over the data link.

15. The method of claim 8, wherein registering the access device also includes transmitting an access device identification code to the vehicle, thereby storing the access identification code in memory of the vehicle.

\* \* \* \* \*